March 31, 1964  A. SAYAG  3,127,200
EXPANSION JOINTS FOR PIPES

Filed May 1, 1961  3 Sheets-Sheet 1

INVENTOR.
ANDRE SAYAG
BY
ATTORNEY

United States Patent Office 3,127,200
Patented Mar. 31, 1964

3,127,200
EXPANSION JOINTS FOR PIPES
Andre Sayag, Paris, France, assignor, by mesne assignments, to Zallea Brothers, Inc., Wilmington, Del., a corporation of Delaware
Filed May 1, 1961, Ser. No. 106,660
Claims priority, application France May 6, 1960
6 Claims. (Cl. 285—226)

This invention relates generally to expansion-jointed fluid-conveying conduits or pipe lines and more particularly to an improved construction thereof for maintaining the conduit and its expansion joint or joints at a constant heated temperature to facilitate the flow of the material being conveyed through the pipe line.

Certain products can be conveyed in conduits or pipe lines only when hot and it is accordingly necessary to heat the pipes to a constant temperature sufficiently high to maintain the product in its requisite state of fluidity. The customary method of obtaining this constancy of temperature is an annular jacket which is arranged about and embraces the entire length of the pipe, the space located between the pipe and its embracing jacket being designed to receive the heating medium. It is necessary in certain applications to provide expansion joints in the pipes and in such cases it has been proposed, in order to maintain these joints also at the desired temperature, to provide the same with embracing jackets having included therein their own expansion joints, the latter being arranged in spaced concentric relation to those of the main conveying conduit. Such expedient having proved to be expensive and not altogether satisfactory, it has been further proposed to eliminate the jacket altogether at the expansion joint, but this has also proved to be objectionable because the resulting drop in temperature in the region of the expansion joint seriously affected the fluidity of the material being conveyed through the main conduit.

The object of the present invention is to overcome the said drawbacks, and particularly to eliminate the jacket at the expansion joint and obtain a much more economical construction of pipe lines which necessarily contain expansion joints. For this purpose, this invention has as its object an improved construction of expansion joint containing its own heating device, said heating device being characterized by tubular rings arranged respectively in the hollows of the expansion joint, and which are interconnected, either in series or parallel relation, so as to permit a heating fluid to circulate through them about the entire extent of the expansion joint. In another embodiment of the expansion joint of the invention, tubular rings are arranged also in the hollows of the expansion joint proper, but in this case the heating of the joint is effected by means of electrical resistors arranged within said tubular rings.

The present invention will be better understood by reference to the following description and to the accompanying drawings, in which.

Figure 4:
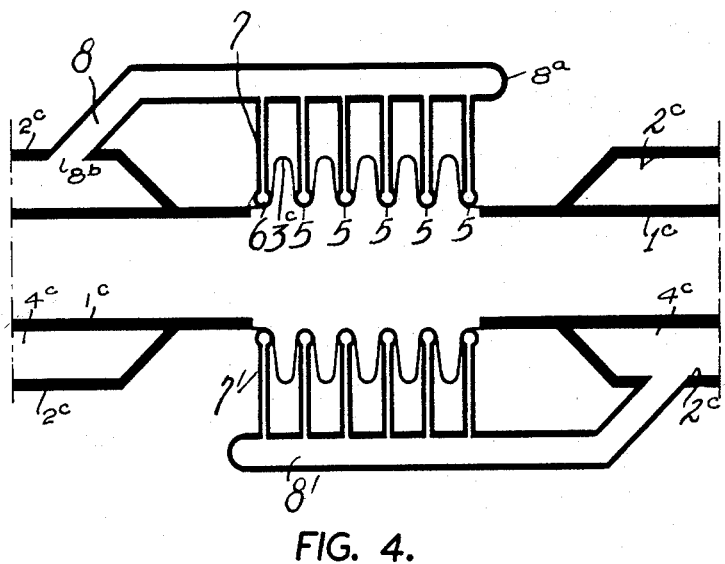
Figure 5:
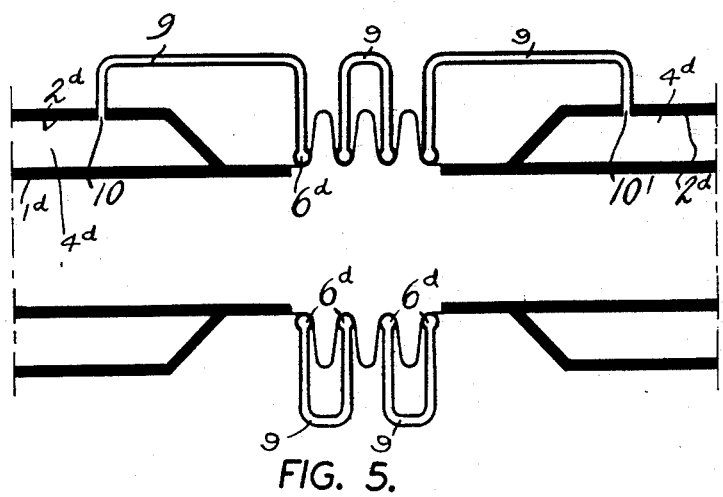
Figure 6:
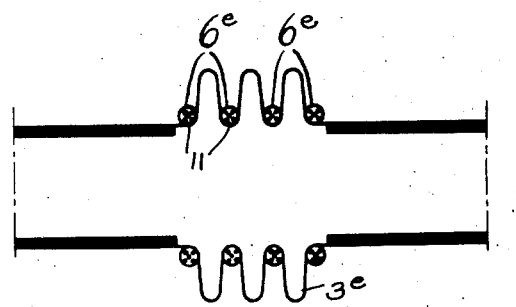
Figure 7:
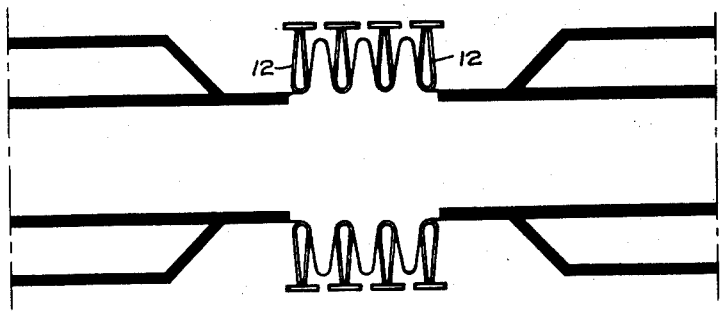

FIGURE 4 shows an expansion joint in accordance with the invention, the tubular heating rings being connected in parallel, the upper portion showing the entrance passage for flow of the fluent heating medium from the jacket at one end of the expansion joint into said rings and the lower portion showing the discharge passage for flow of the heating medium from said rings into the jacket at the opposite end of the expansion joint;

FIGURE 5 is a view of an expansion joint in accordance with the invention, the tubular heating rings being shown in this instance connected in series relation;

FIGURE 6 shows an expansion joint in accordance with the invention, the tubular heating rings being provided with electric resistors; and FIGURE 7 shows still another embodiment of the joint in accordance with the invention.

Figure 1:
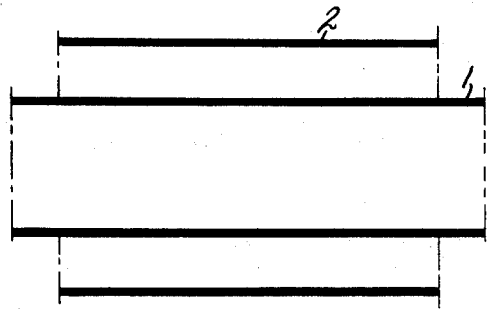
FIGURE 1 shows a main conduit or pipeline provided with an external annular jacket providing a space through which the heating fluent medium may be circulated.

Referring now to the drawings, and more particularly to FIGURE 1 thereof, it will be noted that the main conveying conduit or pipe line 1 is provided with an external jacket 2 to form an annular space or plenum extending along the full length of the conduit 1 through which may be circulated a fluent heating medium for heating the material flowing through the main conveying conduit. However, in this arrangement of FIGURE 1 the main conveying conduit and its embracing jacket are devoid of any expansion joints.

Figure 2:
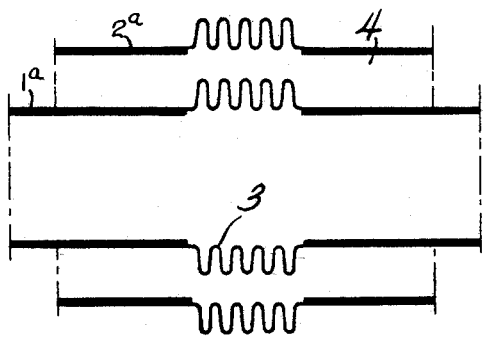
FIGURE 2 is a cross-section of an expansion-jointed pipe line provided with a surrounding jacket which is also provided with an expansion joint concentric with that of the main pipe line to provide a chamber for the flow of the heating medium about the pipe line and its joint.

FIGURE 2 shows an arrangement wherein the main conveying conduit 1a, such as that designated 1 in FIGURE 1, is fitted with an expansion joint 3, while the external jacket 2a, such as that designated 2 in FIGURE 1, is similarly fitted with its own expansion joint arranged in spaced concentric relation to the main line joint 3. In this case, as in the arrangement of FIGURE 1, the annular space 4 formed between the main conduit and its jacket is designed to permit the flow therethrough of a heated fluent medium for heating the material conveyed through the main line.

Figure 3:
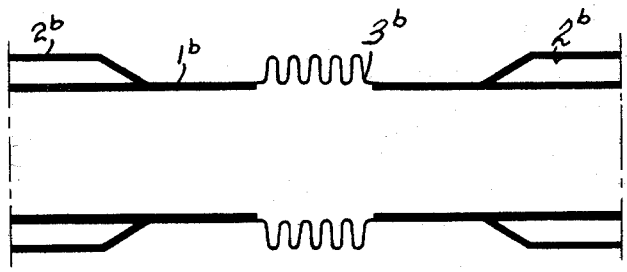
FIGURE 3 shows a pipe provided with an expansion joint, the joint itself being without any embracing jacket.

In the arrangement of FIGURE 3, the main conduit 1b is provided with an expansion joint 3b as in the arrangement of FIGURE 2, but in this instance the external jacket 2b does not extend about the said expansion joint 3b and instead terminates short of the joint at opposite ends thereof. Thus, in the arrangement of FIGURE 3, the expansion joint in the main conveying pipe line or conduit is completely exposed and so is not subject to being heated by the heating medium supplied to the jacketed space at opposite ends of the joint.

The construction of the present invention is shown, in one embodiment thereof, in FIGURE 4 wherein the main conveying pipe line 1c is provided with an expansion joint 3c and with embracing jackets 2c—2c extending lengthwise of the conduit in axially spaced relation to the intervening joint 3c similarly to the arrangement shown in FIGURE 3. Fitted in the hollows 5 of each such expansion joint 3c in the line are a plurality of tubular rings 6, each hollow of the joint being fitted with its own ring 6. The several tubular rings 6 are disposed in axially spaced parallel relation, each ring being connected by a flexible tube 7 to a manifold 8 spaced radially outwardly from one side of the expansion joint and extending along the length thereof as shown. A second set of flexible tubes 7' respectively connect the tubular rings 6 to a second manifold 8' also spaced radially outwardly from the expansion joint, preferably in diametrically opposed relation to the manifold 8.

The manifold 8 is closed off at one end thereof as at 8a, while its opposite end 8b is connected to and is thus in free communication with the annular plenum formed between the main conduit 1 and the external jacket 2 arranged in spaced, concentric relation about the conduit 1 to one side of the expansion joint. Similarly, the diametrically opposed manifold 8', which is also closed at one end, is connected at its open end to the annular plenum formed between the main conduit 1 and the external jacket 2 embracing the conduit upon the opposite side of the expansion joint. It will be apparent that in this arrangement as shown in FIGURE 4, the fluent heating medium for heating the material conveyed through the main conduit flows from the plenum 4c at one side of the expansion joint into the manifold immediately connected thereto, e.g., the manifold 8, and thence by way of the connecting tubes 7 into the tubular rings 6 for discharge into and flow through the plenum 4c at the opposite side of the expansion joint by way of the tubes 7' and the manifold 8' to which they are connected. Thus, the heating medium is caused to flow through the jacket which embraces the main pipe line and about the expansion joint and so heat to constant temperature the material as it flows not only through the conveying pipe line but also through the expansion joint thereof. It will be apparent also that in this arrangement uniform heating of the material conveyed through the jointed pipe line is attained without requiring the use of a separate expansion joint in the surrounding jacket of the pipe line, as in the arrangement shown in FIGURE 2.

In the modification of the present invention, as shown in FIGURE 5, the expansion joint of the jacketed main conveying line is provided with the tubular rings 6d respectively seated in the several hollows of the joint as described in connection with the construction of FIGURE 4. However, in the embodiment of FIGURE 5, the rings 6d are interconnected in series relation between the axially spaced annular plenums 4d formed between the pipe line 1d and its surrounding jacket 2d by means of the flexible connecting tubes 9, so that the flow of the fluent heating medium is from the jacketed plenums 4d to one side of the expansion joint into the inlet connecting tube 9, as at 10, and thence through the tubular rings 6d connected in series by the intermediate connecting tubes 9 for discharge, as at 10', into the jacketed plenum 4d on the opposite side of the expansion joint by way of the outlet connecting tube 9.

In the arrangements of FIGURES 4 and 5 as hereinbefore described, the tubular heating rings and their connecting tubes may be made of any suitable material, such as steel, alloy steel, stainless steel, plastic, rubber, etc., the connecting tubes 7 and 7' in FIGURE 4 and 9 in FIGURE 5 being sufficiently flexible to permit such expansion and contraction of the joint as may take place during operation of the jointed pipe line.

FIGURE 6 shows still another embodiment of the present invention wherein the expansion joint of the main pipe line is heated by eelctrical resistors 11 suitably disposed in encircling relation about the expansion joint. In this modification of the present invention, as shown, the electrical resistors are encased within the tubular rings 6e respectively nested in the several hollows of the expansion joint 3e to thereby electrically heat the expansion joint and so maintain fluent at a constant temperature the material flowing through the joint.

It should be noted that the objectives of the present invention may be obtained by using in lieu of the tubular rings hereinbefore described hollow equalizing rings 12 as shown in FIGURE 7, similar to those presently employed in certain constructions of expansion joints, such as the equalizing rings shown in United States Letters Patent No. 2,489,844 of November 29, 1949. Where such equalizing rings 12 are employed pursuant to the principles of the present invention, it is only necessary to make suitable provision either for the circulation of a fluent heating medium therethrough, in the same manner as hereinbefore described for the circulation of such medium through the tubular rings 6 shown in FIGURES 4 and 5, or for encasing therewithin suitable electrical resistors as shown and described in connection with the arrangement of FIGURE 6, the hollow equalizing rings 12 being employed in either instance in lieu of and for the same purposes as the tubular rings hereinbefore described and shown.

It will be understood that the invention is not limited to the embodiments described, but covers any variant of an expansion joint intended for pipelines which makes it possible to avoid the use of a jacket or double-jacket, to employ the expression generally used by those skilled in the art.

What is claimed as new and useful is:

1. An expansion joint adapted for series connection into a conduit which has a surrounding jacket defining a plenum between the conduit and jacket through which plenum a heated fluent medium is circulated to heat the material passing through the conduit, comprising in combination, a corrugated bellows element formed with axially spaced alternating peaks and hollows, a plurality of discrete tubular rings disposed externally within the hollows of said bellows element, a first plurality of flexible tubes each connected at one end thereof to a different one of said tubular rings and connected at their opposite ends to a first manifold, a second plurality of flexible tubes each connected at one end to different ones of said tubular rings to which said first plurality of flexible tubes is also connected and being connected at their opposite ends to a second manifold, and means for connecting said manifolds respectively to the conduit plenums on opposite sides of said expansion joint, whereby the heated fluent medium in the plenums may flow continuously from one plenum to the other through the manifolds, flexible tubes and tubular rings of the expansion joint structure and thereby heat the joint as well as the conduit.

2. An expansion joint adapted for series connection into a conduit which has a surrounding jacket defining a plenum between the conduit and jacket through which plenum a heated fluent medium is circulated to heat the material passing through the conduit, comprising in combination, a corrugated bellows element formed with axially spaced alternating peaks and hollows, a plurality of discrete tubular rings disposed externally within the hollows of said bellows element, a separate pair of flexible tubes associated with each of said tubular rings, one end of each tube of a pair being connected to the associated ring at a point located diametrically across the ring from the ring connection with the other tube, the remaining end of one tube of each pair being connected to a first manifold and the remaining end of the other tube of each pair being connected to a second manifold, and means for connecting said manifolds respectively to the conduit plenums on opposite sides of said expansion joint, whereby the heated fluent medium in the plenums may flow continuously from one plenum to the other through the manifolds, flexible tubes and tubular rings of the expansion joint structure and thereby heat the joint as well as the conduit.

3. An expansion joint adapted for series connection into a conduit which has a surrounding jacket defining a plenum between the conduit and jacket through which plenum a heated fluent medium is circulated to heat the material passing through the conduit, comprising in combination, a corrugated bellows element formed with axially spaced alternating peaks and hollows, a plurality of discrete tubular rings disposed externally within the hollows of said bellows element, a plurality of flexible tubes connecting said plurality of tubular rings in a continuous series, and means for connecting the first and last tubular ring of said series respectively to the conduit plenums on opposite sides of said expansion joint, whereby the heated fluent medium in the plenums may flow continuously from one plenum to the other through the series connected tubular rings of the expansion joint structure and thereby heat the joint as well as the conduit.

4. An expansion joint adapted for series connection into a conduit comprising, in combination, a corrugated bellows element formed with alternating peaks and hollows respectively disposed in axially spaced parallel relation orthogonally with respect to the axis of the bellows element, a plurality of discrete hollow rings respectively nested within the hollows of said bellows element in heat-transferring contact with the external surface of said element, conduit means communicative with and interconnecting said rings for passage of a fluent heating medium circumferentially about said bellows element unidirectionally from one end toward the opposite end thereof, and means connecting said conduit means to a source of supply of said fluent heating medium.

5. An expansion joint adapted for series connection into a conduit comprising, in combination, a corrugated bellows element formed with alternating peaks and hollows respectively disposed in axially spaced relation orthogonally with respect to the axis of the bellows element, a plurality of discrete hollow rings respectively nested within the hollows of said bellows element in heat-transferring contact with the external surface of said element, a first set of tubes each connected at one end thereof to each of said rings with their opposite ends commonly connected to an inlet manifold for supplying a heated fluent medium to said rings, a second set of tubes also each connected at one end thereof to each of said rings with the opposite ends thereof commonly connected to an outlet manifold for discharge of said heated fluent medium from said rings, and means for supplying a heated fluent medium to said inlet manifold for continuous flow thereof through said rings to and through said outlet manifold.

6. An expansion joint adapted for series connection into a conduit comprising, in combination, a corrugated bellows element formed with alternating peaks and hollows respectively disposed in axially spaced relation orthogonally with respect to the axis of the bellows element, a plurality of discrete hollow rings respectively nested within the hollows of said bellows element in heat-transferring contact with the external surface of said element, conduit means interconnecting said rings in a continuous series, a conduit system for supply of a heated fluent medium to said hollow rings, and means connecting the first and last of said series-connected rings into said system for continuous flow of the heated fluent medium unidirectionally through said series of hollow rings for heating said bellows element.

References Cited in the file of this patent

UNITED STATES PATENTS

| | | |
|---|---|---|
| 987,461 | Hendrix | Mar. 21, 1911 |
| 1,684,083 | Bloom | Sept. 11, 1928 |
| 1,891,058 | Smith | Dec. 13, 1932 |
| 1,913,573 | Turner | June 13, 1933 |
| 1,934,787 | Bjorklund | Nov. 14, 1933 |
| 2,183,596 | Trinks | Dec. 19, 1939 |
| 2,362,911 | Litton | Nov. 14, 1944 |
| 2,695,182 | Folz | Nov. 23, 1954 |
| 2,762,448 | Schmid | Sept. 11, 1956 |
| 2,930,116 | Minges | Mar. 29, 1960 |
| 3,105,708 | Esty | Oct. 1, 1963 |

FOREIGN PATENTS

| | | |
|---|---|---|
| 637,122 | Great Britain | May 10, 1950 |